United States Patent
Baba et al.

(10) Patent No.: US 10,457,067 B2
(45) Date of Patent: Oct. 29, 2019

(54) RECORDING APPARATUS AND RECORDING METHOD

(71) Applicant: CANON KABUSHIKI KAISHA, Tokyo (JP)

(72) Inventors: Naoko Baba, Kawasaki (JP); Kazuki Narumi, Komae (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/794,525

(22) Filed: Oct. 26, 2017

(65) Prior Publication Data
US 2018/0117928 A1     May 3, 2018

(30) Foreign Application Priority Data
Oct. 31, 2016    (JP) ................. 2016-213537

(51) Int. Cl.
| | |
|---|---|
| *B41J 2/36* | (2006.01) |
| *B41J 2/01* | (2006.01) |
| *B41J 2/505* | (2006.01) |
| *G06K 15/02* | (2006.01) |

(52) U.S. Cl.
CPC ................. *B41J 2/362* (2013.01); *B41J 2/01* (2013.01); *B41J 2/5056* (2013.01); *G06K 15/027* (2013.01)

(58) Field of Classification Search
CPC . B41J 2/362; B41J 2/01; B41J 2/5056; G06K 15/027
See application file for complete search history.

(56) References Cited

U.S. PATENT DOCUMENTS 9,747,533 B2 *   8/2017   Nagai .................. G06K 15/107

FOREIGN PATENT DOCUMENTS

| JP | H05-069545 A | 3/1993 |
|---|---|---|
| JP | 2001-105697 A | 4/2001 |

\* cited by examiner

*Primary Examiner* — Henok D Legesse
(74) *Attorney, Agent, or Firm* — Canon U.S.A., Inc. IP Division

(57) ABSTRACT

Each area in a test pattern for performing color shift correction is recorded by a discharge port at an edge portion in many times of scanning and by a discharge port other than the discharge port at the edge portion in fewer times of scanning.

20 Claims, 13 Drawing Sheets

RECORDING APPARATUS AND RECORDING METHOD

BACKGROUND OF THE INVENTION

Field of the Invention

One disclosed aspect of the embodiments relates to a recording apparatus and a recording method.

Description of the Related Art

Recording apparatuses are known which use recording heads including discharge port arrays in which a plurality of discharge ports for discharging ink are arranged and perform recording by discharging ink while moving the recording heads. In such recording apparatuses, discharge characteristics of the discharge ports may vary due to manufacturing errors and the like, and accordingly discharge amounts may vary depending on the discharge ports. When such variation in discharge amount occurs, density unevenness may be caused in an image recorded on a recording medium.

In this regard, Japanese Patent Applications Laid-Open No. 5-069545 and No. 2001-105697 describe a head shading method which records a test pattern from a recording head, reads a discharge characteristic of the test pattern by a sensor, and corrects image data corresponding to each discharge port based on the read result.

As the head shading method, Japanese Patent Application Laid-Open No. 5-069545 describes that a discharge characteristic of a test pattern is obtained in units of a discharge port by one reading operation in each image area, and image data is corrected for each discharge port based on the discharge characteristic. Japanese Patent Application Laid-Open No. 2001-105697 describes that a test pattern is recorded for each discharge port group including a plurality of discharge ports, a plurality of the test patterns is each read using a low resolution sensor to obtain a discharge characteristic of the test pattern in units of each discharge port group, and image data is corrected for each discharge port group.

However, according to the method described in Japanese Patent Application Laid-Open No. 5-069545, the discharge characteristic of the test pattern is obtained for each one of the discharge ports in only one reading operation. Thus, a high resolution sensor is required which increases a cost of the recording apparatus.

On the other hand, according to the method described in Japanese Patent Application Laid-Open No. 2001-105697, the discharge characteristics of the test patterns are not obtained for each of the discharge ports, so that the sensor to be used may be a low resolution sensor. However, a plurality of the test patterns is recorded, and thus used amounts of an ink and a recording medium may become large. In addition, the method described in Japanese Patent Application Laid-Open No. 2001-105697 has a possibility of causing density unevenness in each discharge port group to be read. In this method, the discharge characteristic is separately obtained for each discharge port group, and accordingly a density difference between adjacent a plurality of discharge port groups may be often visually recognized.

SUMMARY OF THE INVENTION

One disclosed aspect of the embodiments is directed to suitably suppressing occurrence of density unevenness due to variation in discharge characteristics of discharge ports while suppressing a cost of a recording apparatus in consideration of the above-described issues.

Thus, an example of the embodiments is a recording apparatus which performs recording by discharging an ink based on recording data while causing a recording head including a discharge port array in which a plurality of discharge ports for discharging an ink are arranged in an array direction to scan a recording medium. The recording apparatus includes a test pattern recording unit, a reading unit, an obtaining unit, a correction unit, and a generation unit. The test pattern recording unit is configured to record a test pattern on a recording medium using the recording head. The reading unit is configured to read the test pattern. The obtaining unit is configured to obtain image data corresponding to an image recorded by discharge from the plurality of the discharge ports. The correction unit is configured to correct the image data based on a read result of the test pattern. The generation unit is configured to generate the recording data based on image data corrected by the correction unit. A first area is recorded in each of K ($K \geq 2$) times of scanning by the recording head using a first discharge port at an edge portion in the array direction in the discharge port array. A second area is recorded in each of L ($L<K$) times of scanning by the recording head using a second discharge port at a center side area in the array direction than the edge portion of the discharge port array. The test pattern recording unit records the test pattern so that the first area and the second area are aligned in the array direction.

Further features of the disclosure will become apparent from the following description of exemplary embodiments with reference to the attached drawings.

DESCRIPTION OF THE EMBODIMENTS

Various exemplary embodiments of the disclosure will be described in detail below with reference to the attached drawings.

Figure 1:
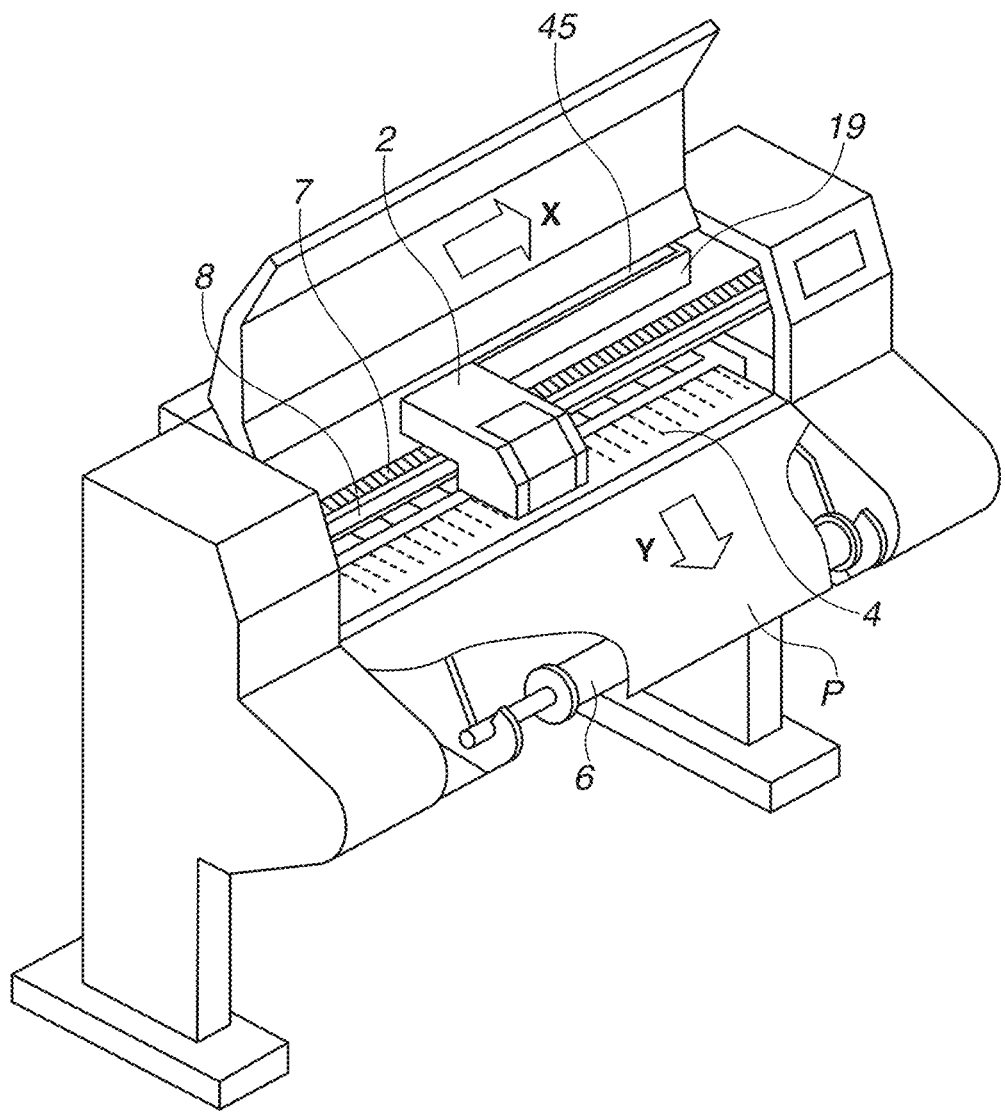
FIG. 1 is a perspective view of a recording apparatus applied to an exemplary embodiment.

FIG. 1 illustrates an external appearance of an ink jet recording apparatus (hereinbelow, also referred to as a recording apparatus or a printer) according to a first exemplary embodiment. The recording apparatus is a serial scanning type printer which records an image by causing a recording head to scan in an X direction (a scan direction) intersecting a Y direction (a conveyance direction) of a recording medium P.

A configuration and a summary of recording operations of the ink jet recording apparatus are described with reference to FIG. 1. First, a conveyance roller driven by a conveyance motor, which is not illustrated, via a gear conveys the recording medium P to the Y direction from a spool 6 holding the recording medium P. On the other hand, a carriage unit 2 performs reciprocating scanning (reciprocating movement) at a predetermined conveyance position by a carriage motor, which is not illustrated, along a guide shaft 8 extending in the X direction. In the scanning process, a discharge port in a recording head (described below) which can be attached to the carriage unit 2 performs a discharge operation at a timing based on a position signal obtained by an encoder 7, and a certain bandwidth corresponding to an array range of the discharge port is recorded. According to the present exemplary embodiment, scanning is performed at a scanning speed of 40 inches per second, and a discharge operation is performed at resolution of 600 dpi (1/600 inch). Subsequently, the recording medium P is conveyed, and a next bandwidth is recorded.

The carriage unit 2 is provided with a below-described multipurpose sensor (not illustrated). The multipurpose sensor is used for detecting density of an image recorded on the recording medium P, detecting a width of the recording medium P, detecting a distance from the recording head to the recording medium P, and the like.

A carriage belt can be used to transmit a driving force from the carriage motor to the carriage unit 2. However, instead of the carriage belt, another driving method can be used, for example, a unit which is driven to rotate by the carriage motor, disposed on a lead screw extending in the X direction and the carriage unit 2, and provided with an engaging portion engaging with a groove of the lead screw.

The conveyed recording medium P is pinched and conveyed by a sheet feed roller and a pinch roller and guided to a recording position (a main scanning area of the recording head) on a platen 4. Generally, a face surface of the recording head is capped in an idle state, so that the cap is released before recording, and the recording head or the carriage unit 2 is brought into a scannable state. Subsequently, when data corresponding to one scanning is accumulated in a buffer, the carriage unit 2 performs scanning by the carriage motor and performs recording as described above.

The recording apparatus according to the present exemplary embodiment can perform multipass recording which records an image in a unit area on the recording medium P by a plurality of times (n times) of scanning by the recording head. When a width (a length of a discharge port array) which can be recorded by one scanning is regarded as one band, a width of the unit area is a 1/n band. When the multipass recording is performed, a sheet is conveyed about 1/n band for every one scanning, and scanning is performed again. Accordingly, an image can be completed by a plurality of times (n times) of scanning in which the discharge port involving recording is made different to the unit area on the recording medium.

Figure 2:
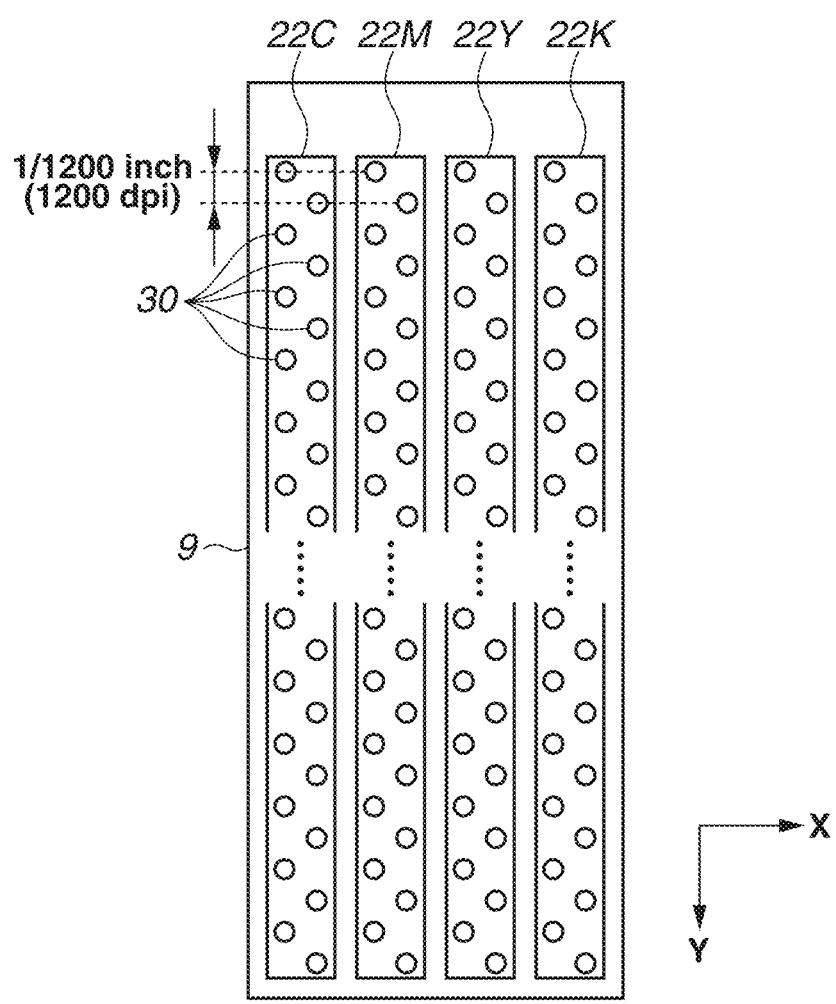
FIG. 2 is a schematic diagram of a recording head applied to the exemplary embodiment.

FIG. 2 illustrates a recording head 9 according to the present exemplary embodiment. The recording head 9 is constituted of a discharge port array 22C for discharging a cyan ink (C), a discharge port array 22M for discharging a magenta ink (M), a discharge port array 22Y for discharging an yellow ink (Y), and a discharge port array 22K for discharging a black ink (K) which are arranged in this order from a left side to a right side in the X direction.

Each of the discharge port arrays 22C, 22M, 22Y, and 22K includes 1280 pieces of discharge ports 30 for discharging inks which are arranged in the Y direction (an array direction) at density of 1200 dpi. A discharge amount of ink discharged at a time from one of the discharge ports 30 according the present exemplary embodiment is approximately 4.5 pl.

The discharge port arrays 22C, 22M, 22Y, and 22K are respectively connected to ink tanks, which are not illustrated, storing corresponding inks and supplied with the inks. The recording head 9 and the ink tanks used in the present exemplary embodiment may be integrally configured or respectively separable.

Figure 3:
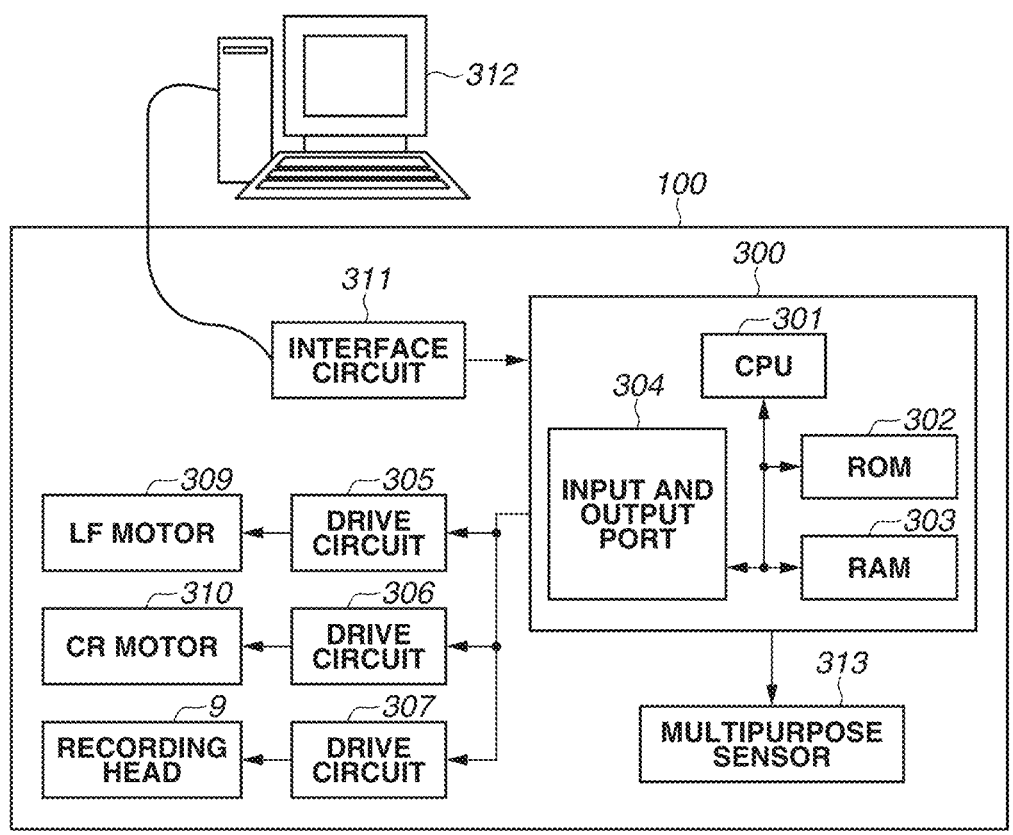
FIG. 3 is a schematic diagram of a recording control system according to the exemplary embodiment.

FIG. 3 is a block diagram illustrating a schematic configuration of a control system in the recording apparatus 100 according to the present exemplary embodiment. A main control unit 300 includes a central processing unit (CPU) 301, a read only memory (ROM) 302, a random access memory (RAM) 303, and an input and output port 304. The CPU 301 executes processing operations such as calculation, selection, determination, and control and a recording operation. The ROM 302 stores a control program or instructions to be executed by the CPU 301 and the like. The RAM 303 is used as a buffer of recording data and the like The RAM 303 may also store programs or instructions to be executed by the CPU 301. The input and output port 304 provides input/output interface to input/output devices. Other peripheral devices, such as communication interface, interrupt controller, etc. may also be included. The ROM 302 also stores a mask pattern, a dither pattern, a look-up table (LUT), test pattern data for recording a below-described test pattern, and the like. The CPU 301 may execute programs or instructions stored in the ROM 302 and/or the RAM 303 to perform operations described in the following.

The input and output port 304 is connected to drive circuits 305, 306, and 307 such as actuators for respectively driving a conveyance motor (LF motor) 309, a carriage motor (CR motor) 310, and the recording head 9. In addition, the main control unit 300 is connected to a multipurpose sensor 313 described below. The main control unit 300 is further connected to a personal computer (PC) 312 as a host computer via an interface circuit 311.

Figure 4A:
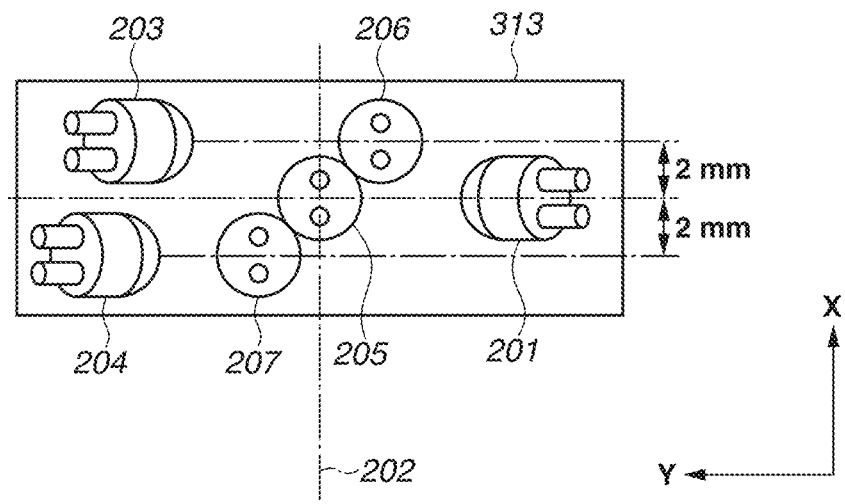
FIGS. 4A and 4B are schematic diagrams of a multipurpose sensor applied to the exemplary embodiment.
Figure 4B:
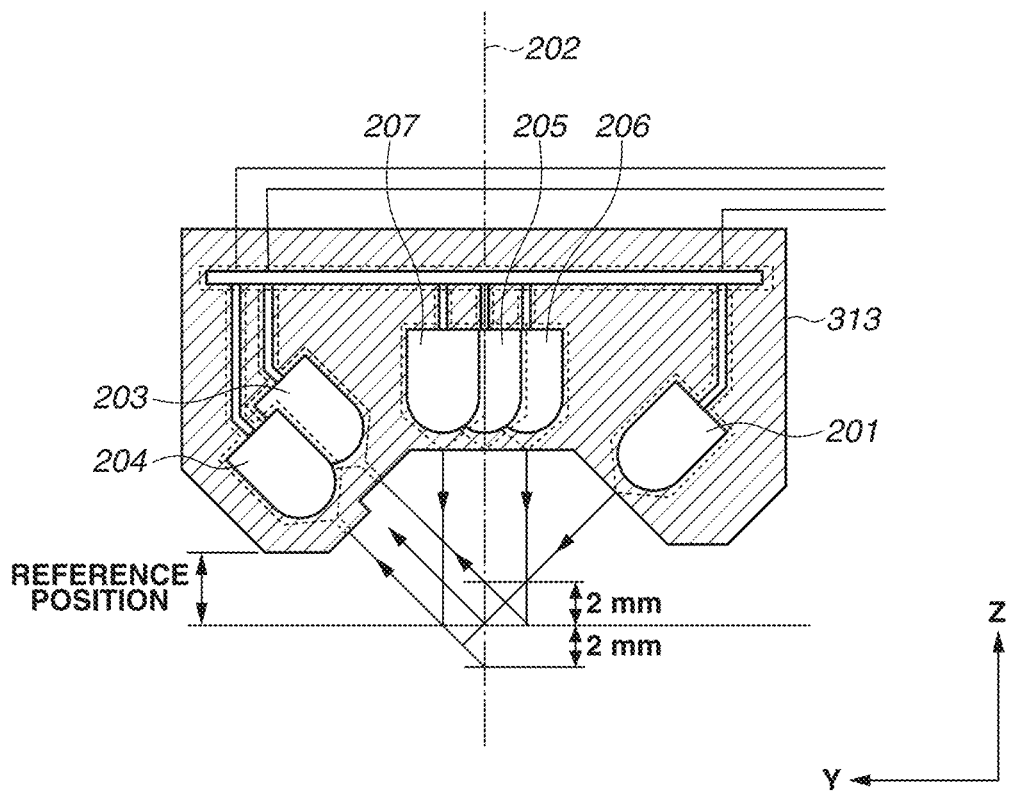

FIGS. 4A and 4B illustrate the multipurpose sensor (reading sensor) 313 according to the present exemplary embodiment. FIG. 4A is a plan view of the multipurpose sensor 313 viewed from a direction perpendicular to an XY plane, and FIG. 4B is a perspective view of the multipurpose sensor 313 viewed from the X-axis direction.

The multipurpose sensor 313 is disposed on a downstream side of the recording head 9 in the Y direction (the conveyance direction) and a higher (upper) position than a formation surface of the discharge port of the recording head 9.

Further, the multipurpose sensor 313 includes two phototransistors 203 and 204 as optical elements, three visible light emitting diodes (LEDs) 205, 206, and 207, and an infrared LED 201, and each element is driven by an external circuit, which is not illustrated. All of these optical elements are shell type elements (general mass production type with a size of φ 3.0 to 3.1 mm) of which a diameter at the largest portion is approximately 4 mm.

In the following descriptions, a straight line connecting a center point in an irradiation range of irradiation light emitted from a light emitting element to a measurement surface and a center of the light emitting element is referred to as an optical axis or an irradiation axis of the light emitting element. The irradiation axis is also a center of a light flux of the irradiation light.

The infrared LED 201 has an irradiation angle of degrees with respect to a surface (a measurement surface) of the recording medium parallel to the XY plane. The irradiation axis as the center of the irradiation light is arranged so as to intersect with a sensor center axis 202 parallel to a normal line (a Z axis) of the measurement surface at a predetermined position. A position of the intersecting position (intersection point) on the Z axis is regarded as a reference position, and a distance from the sensor to the reference position is regarded as a reference distance. A width of the irradiation light of the infrared LED 201 is adjusted by an opening portion, and the irradiation light is optimized to form an irradiation surface (an irradiation area) of approximately 4 to 5 mm in diameter in diameter in the measurement surface on the reference position.

The two phototransistors 203 and 204 have sensitivities for light of wavelengths from visible light to infrared light. When the measurement surface exists on the reference position, the phototransistors 203 and 204 are disposed so that light receiving axes thereof become parallel to a reflection axis of the infrared LED 201. In other words, the light receiving axis of the phototransistor 203 is arranged to be on a position moved to +2 mm in the X direction and +2 mm in the Z direction with respect to the reflection axis. Further, the light receiving axis of the phototransistor 204 is arranged to be on a position moved to −2 mm in the X direction and −2 mm in the Z direction. When the measurement surface exists on the reference position, the measurement surface matches with the intersection point of the irradiation axes of the infrared LED 201 and the visible LED 205, and light receiving areas of the two phototransistors 203 and 204 on this position are formed to sandwich the intersection point therebetween. A spacer approximately 1 mm thick is sandwiched between the two elements so that light received by the respective elements does not sneak in each other. An opening portion is disposed on the phototransistor side to limit a light entering range, and a size of the opening portion is optimized to be able to receive only reflected light in a range of approximately 3 to 4 mm in diameter in the measurement surface on the reference position.

In the following descriptions, a line connecting a center point of an area (range) in which a light receiving element can receive light in the measurement surface (a measurement target surface) and a center of the light receiving element is referred to as an optical axis or a light receiving axis of the light receiving element. The light receiving axis is also a center of a light flux of reflected light which is reflected on the measurement surface and received by the light receiving element.

In FIGS. 4A and 4B, the visible LED 205 is a green visible LED having a green light emission wavelength (approximately 510 to 530 nm) and disposed to match with the sensor center axis 202.

Further, the visible LED 206 is a blue visible LED having a blue light emission wavelength (approximately 460 to 480 nm) and disposed on a position moved to +2 mm in the X direction and −2 mm in the Y direction with respect to the green visible LED 205 as illustrated in FIG. 4A. When the measurement surface exists on the reference position, the blue visible LED 206 is disposed so as to intersect with the light receiving axis of the phototransistor 203 at a position of an intersection point of an irradiation axis of the blue visible LED 206 and the measurement surface.

Further, the visible LED 207 is a monochromatic visible LED having a red light emission wavelength (approximately 620 to 640 nm) and disposed on a position −2 mm in the X direction and +2 mm in the Y direction away from the green visible LED 205 as illustrated in FIG. 4A. When the measurement surface exists on the reference position, the red visible LED 207 is disposed so as to intersect with the light receiving axis of the phototransistor 204 at a position of an intersection point of an irradiation axis of the red visible LED 207 and the measurement surface.

A density of an object can be measured using the above-described multipurpose sensor 313 in such a manner that the visible LED to be used is changed from among the green visible LED 205, the blue visible LED 206, and the red visible LED 207 in response to a color of the object, and reflected light of the light incident on the object is read which is described below. However, the multipurpose sensor 313 used in the present exemplary embodiment has a relatively low reading resolution and can read only a range of a circle of three pixels (three dots) in diameter in one reading operation.

An embodiment of a sensor which can be used according to the present exemplary embodiment is not limited to the above-described one. A colorimeter which can obtain spectral data may be used in the multipurpose sensor. In addition, a densitometer or a colorimeter separated from the recording apparatus 100 may be used, and a densitometer or a colorimeter which can be integrated into the recording apparatus 100 may be used.

(Data Processing Process)

Figure 5:
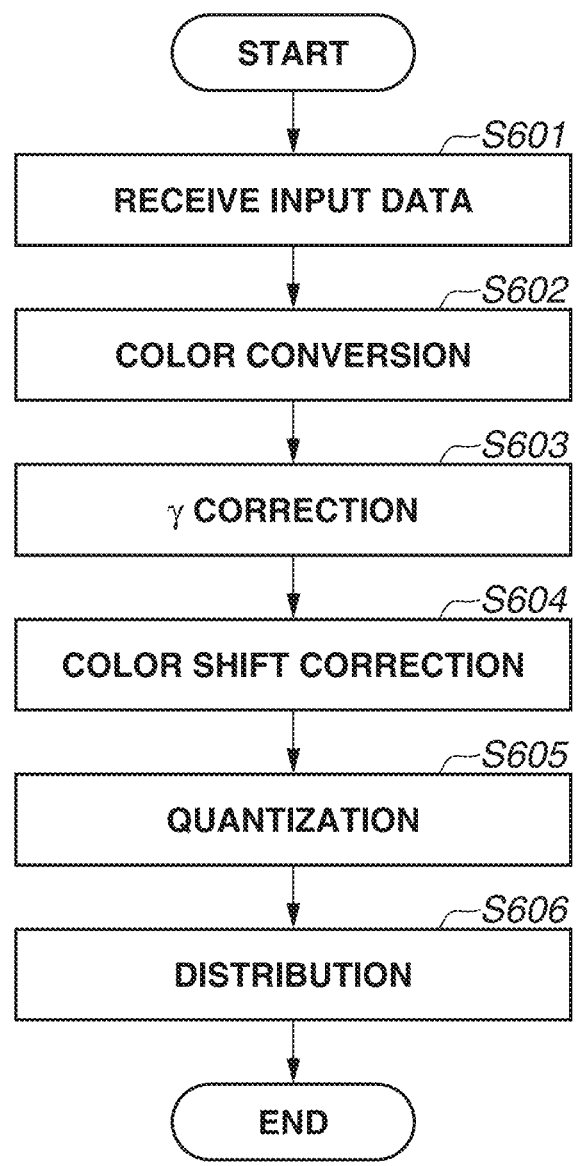
FIG. 5 is a flowchart illustrating data processing processes according to the exemplary embodiment.

FIG. 5 is a flowchart illustrating recording data generation processing executed by the CPU 301 according to a control program of the present exemplary embodiment.

First, in step S601, the CPU 301 receives input data (luminance data) expressed by information (0 to 255) of 8 bits and 256 values of each color of red (R), green (G), and blue (B) input to the image recording apparatus 100 from the PC 312 as the host computer.

Next, in step S602, the CPU 301 converts the luminance data in an RGB format into multi-valued data expressed by ink colors (CMYK) used in recording. According to the color conversion processing, the multi-valued data is generated which is expressed by the information (0 to 255) of 8 bits and 256 values for determining a gradation of each of CMYK inks in each pixel group constituted of a plurality of pixels.

Next, in step S603, the CPU 301 performs γ correction for correcting each multi-valued data in the CMYK format using a one dimensional LUT corresponding to each color stored in the ROM 302. In the one dimensional LUT, each correction value is determined so that each gradation of the multi-valued data in the CMYK format is almost in a linear relationship with a density level of an image to be recorded. Thus, the γ correction is performed, and data can be output so that a density of a recorded image is almost in the linear relationship according to the gradation.

Next, in step S604, color shift correction is executed. Each discharge port in the recording head is likely to cause variation in a discharge characteristic of each discharge port due to a manufacturing error and the like. For example, when ink is discharged without performing the color shift correction in a state in which an ink discharge amount of a certain discharge port is larger than a reference discharge amount, a density of an image recorded by discharge from the relevant discharge port may be deeper than a desired density. Thus, according to the present exemplary embodiment, the color shift correction is performed, and correction is executed on data to reduce influence of variation in the discharge characteristic of each discharge port. In the color shift correction, a test pattern for detecting variation in the discharge characteristics is recorded on a recording medium, then the test pattern is read using the multipurpose sensor 313, and a correction value for correcting color shift is generated based on a density value of the obtained test pattern and a predetermined reference value. The color shift correction is described in detail below.

Next, in step S605, the CPU 301 executes quantization on the data subjected to the color shift correction and generates quantization data (binary data) expressed by information (0, 1) of one bit and two values for determining whether to discharge each of CMYK inks or not to each pixel. As quantization processing, processing can be performed according to various quantization methods such as an error diffusion method, a dither method, and an index method.

In step S606, in the case that multipass recording is performed, the CPU 301 performs distribution processing for distributing the quantization data pieces to a plurality of times of scanning with respect to a unit area of the recording head. By the distribution processing, recording data is generated which is expressed by the information (0, 1) of one bit and two values for determining whether to discharge each of CMYK inks or not to each pixel in each of the plurality of times of scanning with respect to a unit area of the recording medium. The distribution processing corresponds to a plurality of times of scanning and is executed using a mask pattern for determining whether to permit or not the discharge of ink to each pixel. When multipass recording is not performed, in other words, when recording is performed by scanning the unit area on the recording medium by the recording head for each time, step S606 is omitted, and the quantization data is regarded as recording data used for recording.

According to the present exemplary embodiment, the recording head discharges ink according to the recording data generated as described above.

The configuration in which the CPU 301 in the recording apparatus 100 executes all of the processing in steps S601 to S606 is described here, however, the processing can be executed by another configuration. For example, the PC 312 may execute all of the processing in steps S601 to S606. Further, for example, the PC 312 may execute a part of the processing, and the recording apparatus 100 may execute the rest of the processing.

(Color Shift Correction)

Color shift correction according to the present exemplary embodiment is executed by recording and reading a test pattern and generating a correction value based on the read result as described above.

Figure 6:
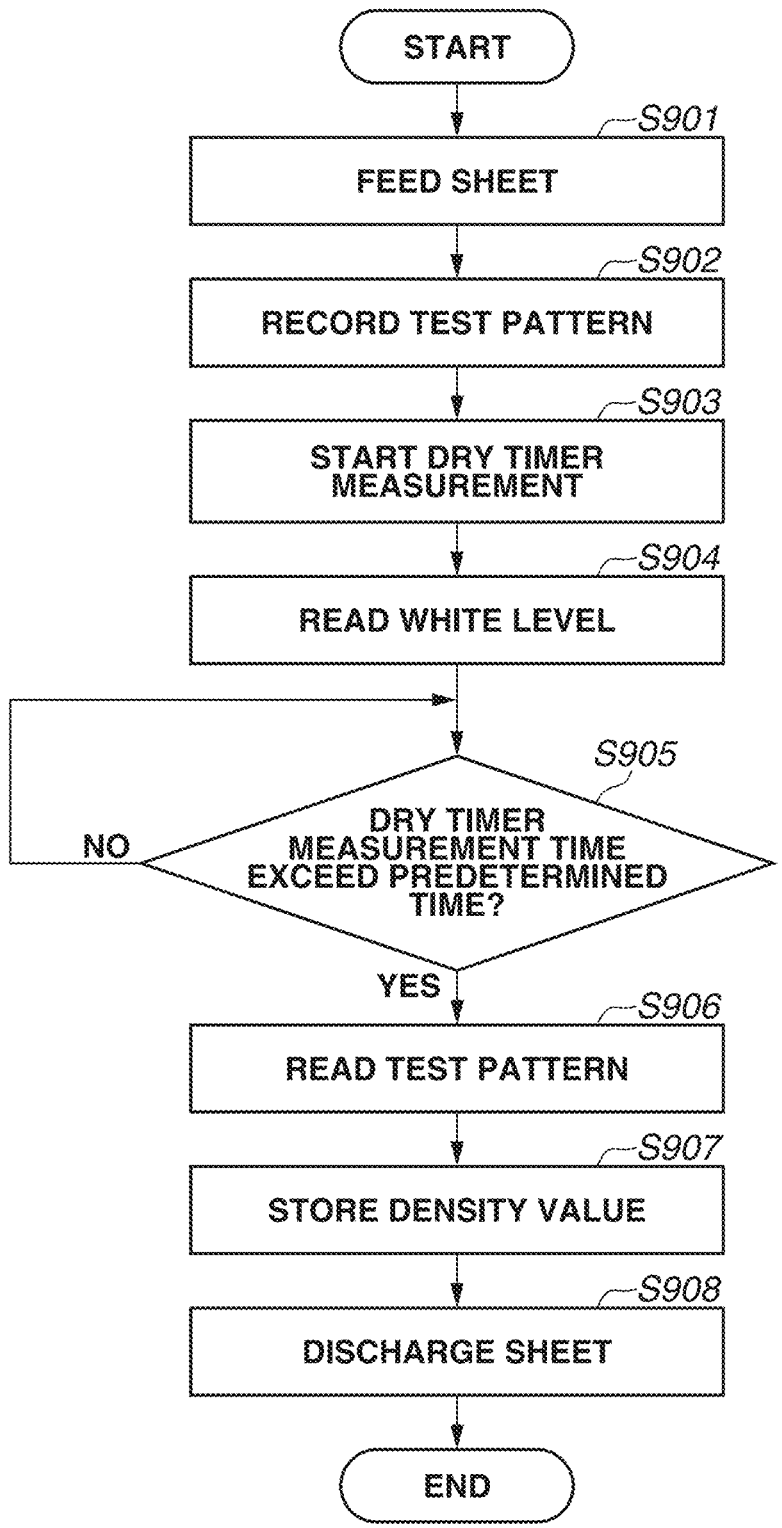
FIG. 6 is a flowchart illustrating test pattern reading processes according to the exemplary embodiment.

FIG. 6 illustrates recording and reading processes of a test pattern executed by the CPU 301 according to a control program of the present exemplary embodiment.

When start of the color shift correction is instructed in step S604, first, in step S901, a recording medium is fed for recording a test pattern. As an execution instruction, an execution instruction from a user may be input via the host PC, or an execution instruction may be input automatically in response to satisfaction of a predetermined condition. The predetermined condition is, for example, a case that the recording medium is changed, a case that a temperature of an environment in which the recording apparatus is installed is changed, or a case that a predetermined time has elapsed from execution of the last correction value calculation processing.

In step S902, each of discharge port groups 201 to 204 in the recording head 9 discharges ink, and the test pattern is recorded. The test pattern to be recorded and recording processes thereof are described in detail below.

Next, in step S903, timer measurement is started for waiting a predetermined time length to dry the test pattern recorded in step S902.

Next, in step S904, reading is performed on a white level (namely a background color of the recording medium) on which the test pattern is not recorded. In the reading, reflected light intensity is measured using the multipurpose sensor 313. A measurement result of the white level is used as a reference of white when a density value of the test pattern to be subsequently recorded is calculated. Thus, the white level value is stored for each LED. As a density of a blank portion in the recording medium on which the test pattern is not recorded, the background color of the recording medium is measured, thus, in the case of a white recording medium, the background color is white. According to the present exemplary embodiment, an example of using a recording medium with white background color is described. When a white background is read, the green visible LED 205, the blue visible LED 206, and the red visible LED 207 are all lit to perform reading.

Next, in step S905, when it is confirmed that a measured time of the dry timer elapsed the predetermined time length (YES in step S905), then in step S906, reading of the test pattern is started by measuring reflected light intensity of the test pattern. The reflected light intensity measurement is performed in such a manner that the visible LED suitable for the ink color of which density is to be measured is lit among the green visible LED 205, the blue visible LED 206, and the red visible LED 207 installed in the multipurpose sensor 313, and the phototransistors 203 and 204 as measurement units for measuring density of the test pattern read the reflected light. Particularly, the green visible LED 205 is lit when a test pattern recorded in the magenta ink is read. The blue visible LED 206 is lit when a test pattern recorded in the yellow ink and the black ink are read. Further, the red visible LED 207 is lit when a test pattern recorded in the cyan ink is read. The reading process of the test pattern is described in detail below.

When reading of the test pattern in step S906 is completed, the density value of the test pattern is calculated based on output values from both of each test pattern and the blank portion (white background). In step S907, the density value of the test pattern is stored in the ROM or the RAM in the recording apparatus. Subsequently, in step S908, the recording medium is discharged, and the processing is terminated.

When the density value of the test pattern is obtained, next, a correction value is calculated for correcting the color shift of each discharge port.

Figure 7:
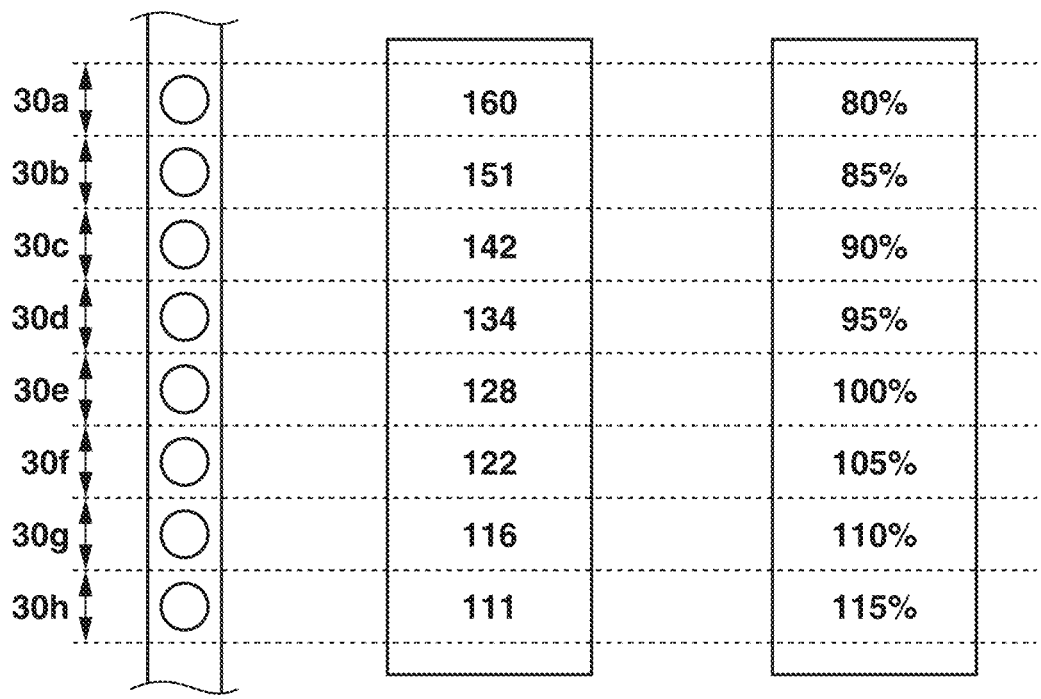
FIGS. 7A to 7C illustrate calculation processes of correction values according to the exemplary embodiment.

FIGS. 7A to 7C illustrate calculation processes of correction values. FIG. 7A schematically illustrates the discharge ports 30a to 30h which are a part of a discharge port array. FIG. 7B schematically illustrates density values of areas respectively corresponding to the discharge ports 30a to 30h which are obtained by reading the test pattern recorded by discharge from the discharge ports 30a to 30h illustrated in FIG. 7A. Further, FIG. 7C illustrates correction values corresponding to the respective discharge ports 30a to 30h which are calculated based on the density values illustrated in FIG. 7B.

A case is described here in which data having a gradation value of 128 among gradation values from 0 to 255 is input as data for recording the test pattern corresponding to the discharge ports 30a to 30h. Thus, when there is no manufacturing error in the discharge ports 30a to 30h, and no variation occurs in the discharge characteristics, the density values obtained by reading the test pattern are 128 (hereinbelow, also referred to as a reference value) in any area.

However, as illustrated in FIG. 7B, the density values actually obtained vary depending on an area. For example, the density value of an area corresponding to the discharge port 30a is 160 which is greater than the reference value. This is because a manufacturing error making a discharge amount larger than the reference is caused in the discharge port 30a. Therefore, when the test pattern is recorded based on the data having the gradation value of 128, the actual test pattern is discharged at the discharge amount corresponding to the density value of 160.

Thus, according to the present exemplary embodiment, correction values corresponding to the respective discharge ports 30a to 30h are calculated by (Equation 1).

Correction value=Reference value/Density value*100 (Equation 1)

In this regard, data for recording the test pattern has the gradation value of 128, and the reference value is 128 as described above.

For example, since the density value corresponding to the discharge port 30a is 160, as illustrated in FIG. 7C, a correction value corresponding to the discharge port 30a becomes 80% (=(128/160)*100). The correction values are similarly calculated with respect to the discharge ports 30b to 30h.

The correction values thus calculated are used, and accordingly density unevenness due to variation in the discharge characteristics can be reduced. For example, when multi-valued data having the gradation value of 128 is input to the discharge port 30a, the multi-valued data is multiplied by the correction value of 80%, and corrected data having a gradation value of 102 (=128*0.8) is generated. The ink is discharged from the discharge port 30a based on the corrected data, and thus influence of the variation in the discharge characteristic (excess of the discharge amount) of the discharge port 30a can be cancelled, and a density of an image to be recorded can be a reference density.

According to the present exemplary embodiment, it is not to record only one test pattern based on data of one gradation value but to record a plurality of test patterns based on a plurality of gradation values for each color, which is described below. Thus, the correction values are also calculated with respect to the plurality of gradation values for each color. Further, when data having the gradation value of which the correction value is calculated is input as the multi-valued data, the color shift correction is performed using the correction values corresponding to the respective gradation values calculated as described above. Furthermore, when data having the gradation value of which the correction value is not calculated is input as the multi-valued data, the correction value may be calculated based on the gradation value close to the gradation value of the multi-valued data among gradation values of which the correction values are calculated. For example, in the case that correction values 110% and 120% are respectively calculated for gradation values of 100 and 200, and data having a gradation value of 150 is input as the multi-valued data, a correction value 115% may be determined by take an intermediate value between the correction values of the gradation values of 100 and 200.

(Recording and Reading of Test Pattern)

Figure 8:
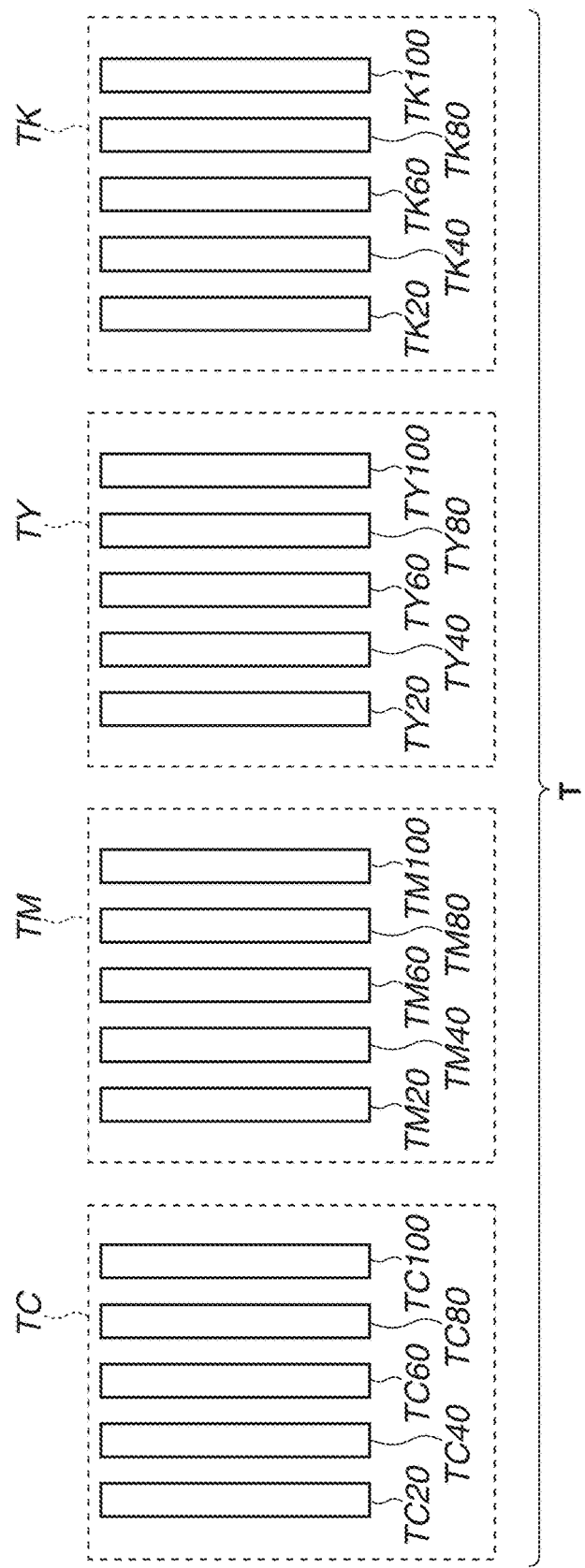
FIG. 8 is a schematic diagram of a test pattern according to the exemplary embodiment.

FIG. 8 schematically illustrates a test pattern T recorded according to the present exemplary embodiment.

The test pattern T is constituted of a pattern TC corresponding to the cyan ink, a pattern TM corresponding to the magenta ink, a pattern TY corresponding to the yellow ink, and a pattern TK corresponding to the black ink. Further, each of the patterns TC, TM, TY, and TK includes five partial patterns corresponding to different gradation values. For example, the pattern TC of the cyan ink includes partial patterns TC20, TC40, TC60, TC80, and TC100 which are respectively recorded based on data pieces of 20%, 40%, 60%, 80%, and 100%. The data pieces of 20%, 40%, 60%, 80%, and 100% respectively correspond to data pieces having a gradation value of 51 (=255*0.2), a gradation value of 102 (=255*0.4), a gradation value of 153 (=255*0.6), a gradation value of 204 (=255*0.8), and a gradation value of 255 (=255*1.0).

Next, recording and reading processes of each partial pattern are described in detail. Only the partial pattern TC100 is described here in a plurality of the partial patterns illustrated in FIG. 8, however, other partial patterns can be recorded by the similar processes.

Figure 9:
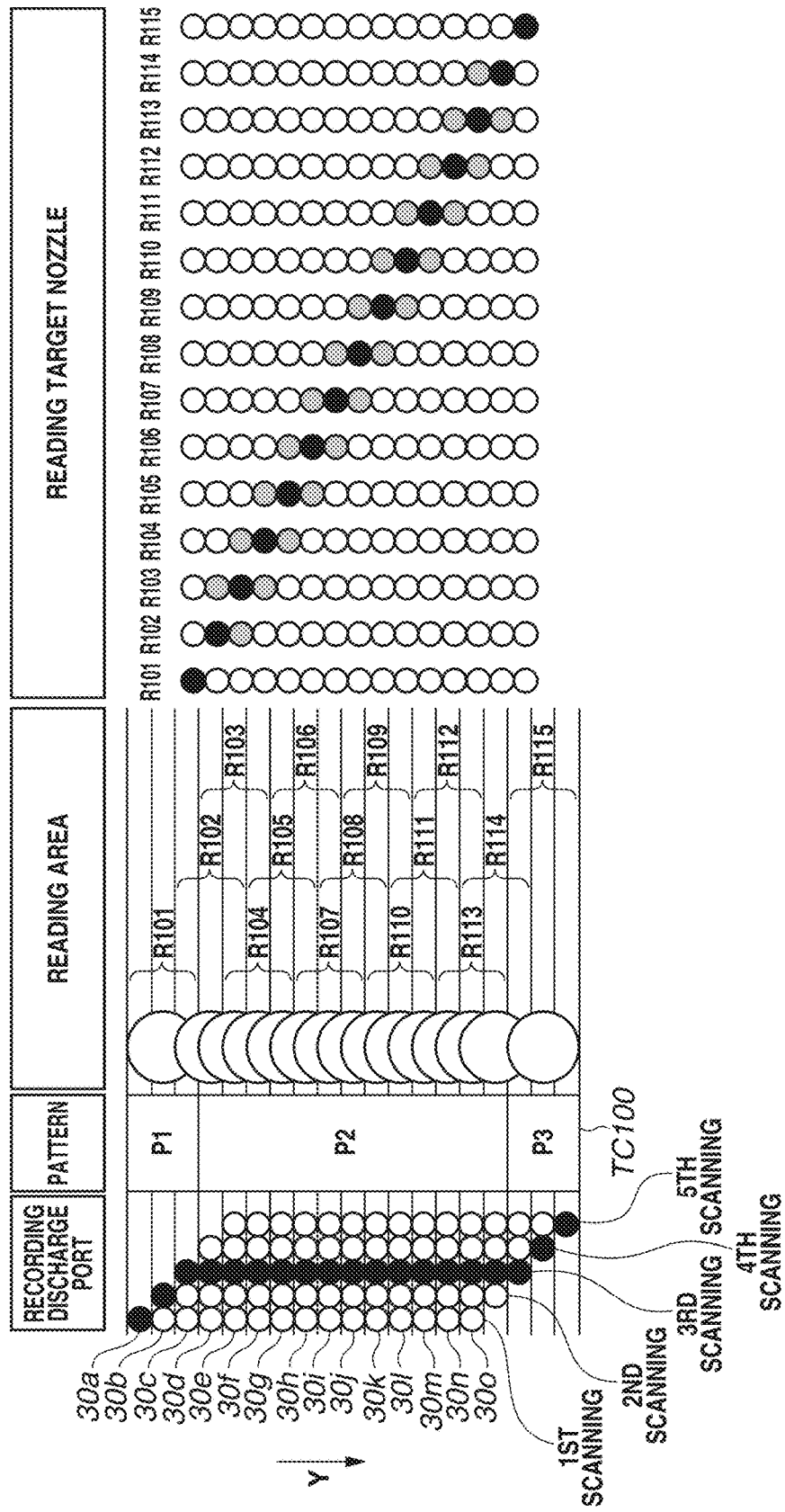
FIG. 9 illustrates recording and reading processes of a test pattern according to the exemplary embodiment.

FIG. 9 illustrates recording and reading processes of the partial pattern TC100 according to the present exemplary embodiment. FIG. 9 illustrates a situation in which the recording head moves to the Y direction for each scanning for simplification, however, a recording medium actually moves to the Y direction for each scanning. In the following, it is described that one discharge port array includes 15 discharge ports 30a to 30o for simplification. Regarding a "recording discharge port" in FIG. 9, portions painted in black represent discharge ports performing discharge and white blank portions represent discharge ports not performing discharge. White blank circles in a "reading area" in FIG. 9 represent reading areas (ranges of circles of three pixels as described above) R101 to R115 in one reading operation. Regarding a "reading target nozzle" in FIG. 9, portions painted in black and portions painted in gray represent discharge ports to which read values of the respective reading areas are reflected, and white blank portions represent non-reflected discharge ports in each of the reading areas R101 to R11. Further, the portions painted in black represent portions which are desirable to be averaged by weighting more than the portions painted in gray.

According to the present exemplary embodiment, the recording head performs scanning five times in total, and recording of the partial pattern TC100 is completed.

First, in first and second scanning, the recording of the partial pattern TC100 is performed using only the discharge port 30a at an edge portion area on an upstream side of the Y direction in the discharge port array. Particularly, the first scanning is performed, recording is performed from the discharge port 30a, and then the recording medium is conveyed only for a distance corresponding to one discharge port. After the conveyance, recording is performed again from the discharge port 30a while performing the second scanning. Accordingly, dots are formed from the discharge port 30a by the first and second scanning at positions adjacent to each other in the Y direction on the recording medium.

After completion of the second scanning, the recording medium is conveyed only for the distance corresponding to one discharge port. Further, recording is performed using all of the discharge ports 30a to 30o in the discharge port array while performing the third scanning, and dots are successively formed on a position adjacent to the dot formed in the second scanning in the Y direction. Then, the recording medium is conveyed only for the distance corresponding to one discharge port.

Subsequently, recording is performed using only the discharge port 30*o* at an edge portion on a downstream side of the Y direction in the discharge port array while performing fourth and fifth scanning. Particularly, recording is performed from the discharge port 30*o* in the fourth scanning, then the recording medium is conveyed only for the distance corresponding to one discharge port, and recording is performed again from the discharge port 30*o* in the fifth scanning.

Recording is performed while performing the above-described first to fifth scanning, and thus the recording of the partial pattern TC100 is completed. In this regard, recording of an area P1 (three pixels) at the edge portion on the upstream side of the Y direction in the partial pattern TC100 is performed from the discharge port 30*a* in each of the first, second, and third scanning. On the other hand, recording of an area P3 (three pixels) at the edge portion on the downstream side of the Y direction in the partial pattern TC100 is performed from the discharge port 30*o* in each of the third, fourth, and fifth scanning. Further, recording of an area P2 other than the areas P1 and P3 in the partial pattern TC100 is performed from the discharge ports 30*b* to 30*n* in the third scanning.

Next, the partial pattern TC100 recorded as described above is read using the multipurpose sensor illustrated in FIG. 4, and read values in the CMYK format are obtained.

However, the reading resolution of the multipurpose sensor used in the present exemplary embodiment is only three pixels. In other words, one reading operation can read only an area recorded from the successive three discharge ports in the partial pattern TC100

Thus, according to the present exemplary embodiment, the reading operation of the partial pattern TC100 is performed for a plurality of times by changing an area to be read as illustrated in FIG. 9, and read values in a plurality of areas are obtained.

First, reading is performed on a reading area R101 corresponding to the area P1 recorded using only the discharge port 30*a* in the partial pattern TC100. Then, the recording medium is conveyed by two pixels.

Next, reading is performed on a reading area R102 corresponding to the area recorded using the discharge ports 30*a*, 30*b*, and 30*c* in the partial pattern TC100. Then, the recording medium is conveyed by one pixel.

Next, reading is performed on a reading area R103 corresponding to the area recorded using the discharge ports 30*b*, 30*c*, and 30*d* in the partial pattern TC100. Then, the recording medium is conveyed by one pixel.

Subsequently, reading of reading areas R104 to R114 in the partial pattern TC100 illustrated in FIG. 9 and conveyance of the recording medium by one pixel are alternately repeated in a similar manner.

When reading of the reading area R114 is completed, the recording medium is conveyed by two pixels, and reading is performed on a reading area R115 corresponding to the area P2 recorded using only the discharge port 30*o* in the partial pattern TC100.

By reading of the reading area R115, the reading operation of the partial pattern TC100 is completed.

As described above, according to the present exemplary embodiment, the partial pattern TC100 is divided into the reading areas R101 to R115, the reading operation of the reading areas R101 to R115 are performed for a plurality of times, and read values of the respective reading areas R101 to R115 are obtained.

As can be seen from FIG. 9, in the reading areas R102 to R114, each reading area is set so that the two reading areas adjacent to each other in the Y direction are overlapped with each other at a part and not overlapped at other parts.

Next, density values are calculated for the respective discharge ports 30*a* to 30*o* based on the read values of the respective reading areas R101 to R115.

As can be seen from FIG. 9, the reading area R101 matches with the area P1 recorded using only the discharge port 30*a* in the partial pattern TC100. Thus, the read value of the reading area R101 reflects only a discharge characteristic of the discharge port 30*a*. Therefore, the read value of the reading area R101 is obtained as the density value corresponding to the discharge port 30*a*.

The same can be applied to the discharge port 30*o*. The reading area R115 matches with the area P3 recorded using only the discharge port 30*o*, and the read value of the reading area R115 is obtained as the density value corresponding to the discharge port 30*o*.

On the other hand, regarding the discharge port 30*b* adjacent to a center side of the discharge port array than the discharge port 30*a* at the edge portion, the reading area R102 includes the area recorded by the discharge port 30*b*, and the read value of the reading area R102 reflects a discharge characteristic of the discharge port 30*b*. However, the reading area R102 also includes the areas recorded by the discharge ports 30*a* and 30*c*, and the read value of the reading area R102 reflects not only the discharge characteristic of the discharge port 30*b* but also the discharge characteristics of the discharge ports 30*a* and 30*c*.

In other words, density unevenness of the discharge characteristic specific to the discharge port 30*b* is not perfectly reflected. Therefore, if the read value of the reading area R102 is directly regarded as the density value corresponding to the discharge port 30*b*, there is a possibility that the density unevenness caused by the discharge port 30*b* cannot be suitably suppressed due to influence of the discharge characteristics of the discharge ports 30*a* and 30*c*.

In this regard, not only the reading area R102 but also the reading area R103 includes the area recorded by the discharge port 30*b*. The reading area R103 also includes the area recorded by the discharge ports 30*c* and 30*d* in addition to the discharge port 30*b*, thus, if the read value of the reading area R103 is directly regarded as the density value corresponding to the discharge port 30*b*, similarly the density unevenness caused by the discharge port 30*b* cannot be suitably suppressed.

However, when the density value corresponding to the discharge port 30*b* is calculated based on both of the read value of the reading area R102 and the read value of the reading area R103, at least the influence of the discharge characteristics of the discharge ports 30*a* and 30*d* can be cancelled to some extent. Therefore, the influence of the discharge characteristic of the discharge port 30*b* can be reduced than directly using the read values of the reading areas R102 and R103.

In view of the above-described points, according to the present exemplary embodiment, an average value (simple average) of the read value of the reading area R102 and the read value of the reading area R103 is obtained as the density value corresponding to the discharge port 30*b*.

The same can be applied to the discharge port 30*n*. Since the reading areas R113 and R114 include the areas recorded using the discharge port 30*n*, an average value of the read value of the reading area R113 and the read value of the reading area R114 is obtained as the density value corresponding to the discharge port 30*n*.

Regarding the discharge port 30*c*, the three reading areas R102, R103, and R104 include the areas recorded by the discharge port 30c. Thus, an average value of the read value of the reading area R102, the read value of the reading area R103, and the read value of the reading area R104 is obtained as the density value corresponding to the discharge port 30c.

The discharge ports 30d to 30m are the same as the discharge port 30c. The three reading areas respectively include the areas recorded by the respective discharge ports, so that average values of the read values of the three reading areas are respectively calculated and obtained as the density values corresponding to the respective discharge ports.

The density values corresponding to the respective discharge ports 30a to 30o are calculated as described above according to the present exemplary embodiment. Further, the correction values corresponding to the respective discharge ports 30a to 30o are calculated and applied to the multi-valued data as described with reference to FIGS. 7A to 7C. Accordingly, the density unevenness due to the variation in the discharge characteristics of the respective discharge ports can be suitably suppressed.

The simple average of read values of a plurality of the reading areas recorded by the respective discharge ports are used for the calculation of the density values corresponding to the discharge ports 30b to 30n, however, a weighted average calculated by weighting any of the read values may be used. For example, in the three pixels which can be read by the multipurpose sensor, one pixel in the center can be determined most accurately. Thus, when weighting is performed on the read value of the reading area in which the discharge port of which the density value is calculated matches with the center of the reading area, the density unevenness can be suppressed more suitably. For example, in the calculation of the density value of the discharge port 30c illustrated in FIG. 9, the center of the reading area R103 matches with the discharge port 30c. Thus, the weighted average may be calculated by weighting the read value of the reading area R103 rather than the read values of the respective reading areas R102 and R104.

Next, a first comparative embodiment is described in detail.

According to the first comparative embodiment, a partial pattern recorded from only one discharge port is read in all reading areas. Unless otherwise described, recording and reading of the test pattern are performed similarly to those according to the first exemplary embodiment.

Figure 10:
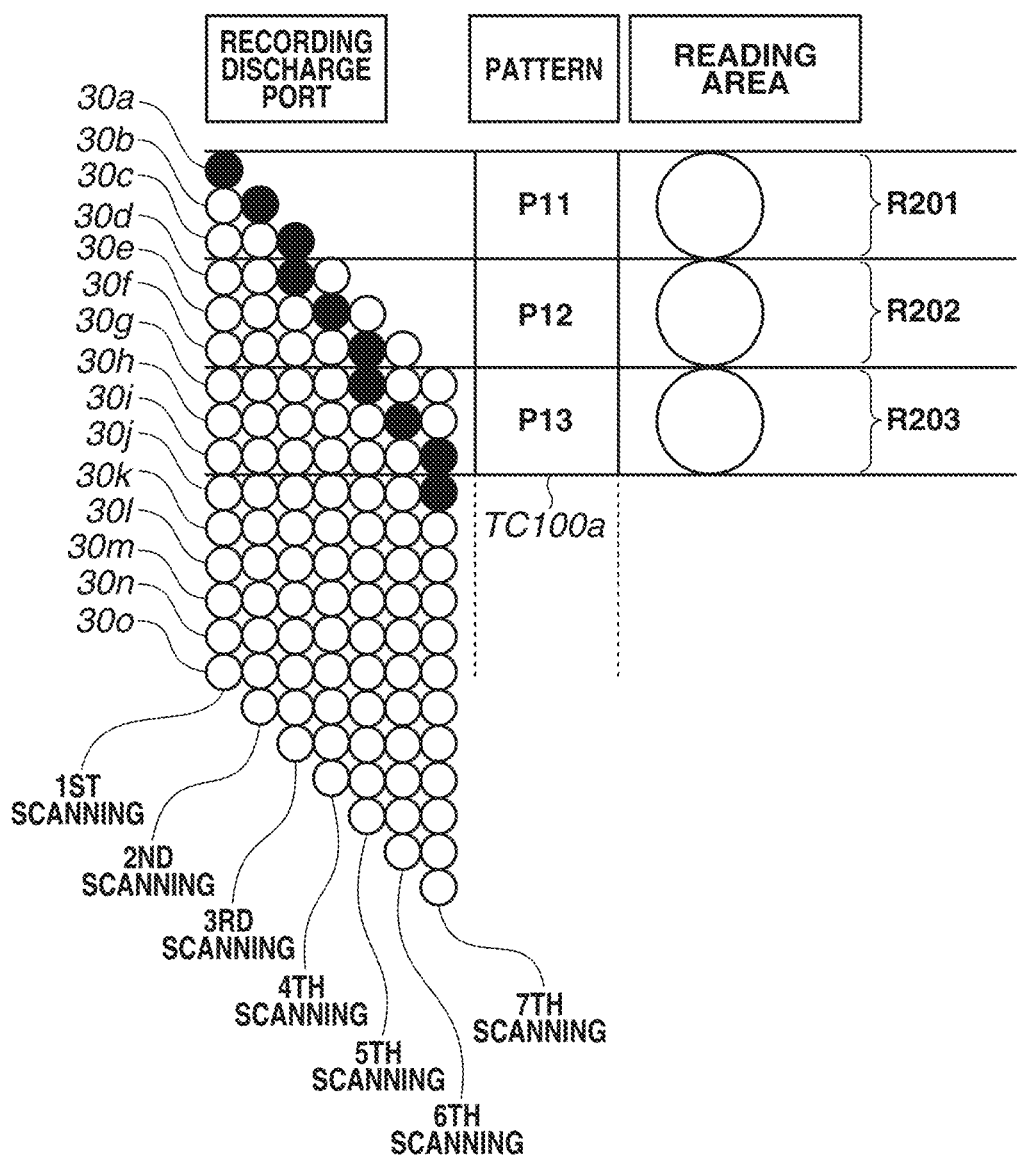
FIG. 10 illustrates recording and reading processes of a test pattern according to a comparative embodiment.

FIG. 10 illustrates recording and reading processes of a partial pattern TC100a according to the first comparative embodiment. In FIG. 10, an entire area of the partial pattern TC100a is not illustrated, and only areas recorded from the discharge ports 30a, 30b, and 30c are illustrated for simplification.

According to the first comparative embodiment, first, the partial pattern TC100a is recorded using only the discharge port 30a in the first scanning. Subsequently, the recording medium is conveyed only for the distance corresponding to one discharge port.

After the conveyance, recording is performed only from the discharge port 30a while performing the second scanning. Subsequently, the recording medium is conveyed only for the distance corresponding to one discharge port.

After the conveyance, recording is performed using the discharge ports 30a and 30b while performing the third scanning. Subsequently, the recording medium is conveyed only for the distance corresponding to one discharge port, and after the conveyance, recording is performed using only the discharge port 30b while performing the fourth scanning.

Further, the recording medium is conveyed only for the distance corresponding to one discharge port.

Subsequently, recording is performed by sequentially repeating recording from the two discharge ports and conveyance and recording from the one discharge port and conveyance.

Next, the partial pattern TC100a is read.

According to the first comparative embodiment, first, reading is performed on a reading area R201 corresponding to an area P11 recorded using only the discharge port 30a in the partial pattern TC100a. Then, the recording medium is conveyed by three pixels.

Next, reading is performed on a reading area R202 corresponding to an area P12 recorded using only the discharge port 30b in the partial pattern TC100a. Then, the recording medium is conveyed by three pixels.

Next, reading is performed on a reading area R203 corresponding to an area P13 recorded using only the discharge port 30c in the partial pattern TC100a. It is not illustrated for simplification, reading and conveyance are repeatedly executed on the subsequent areas in the similar manner, and reading of the partial pattern TC100a is completed.

When recording and reading of the test pattern are performed as illustrated in FIG. 10, the respective reading areas R201 to R203 are recorded by only the respective discharge ports 30a to 30c. Thus, in the calculation of the density values, the read values of the respective reading areas R201 to R203 are obtained as the density values corresponding to the respective discharge port 30a to 30c.

According to the first comparative embodiment, each reading area recorded by the single discharge port can be read, and a value which is not influenced by the discharge characteristics of other discharge ports can be obtained as a correction value corresponding to each discharge port. Therefore, a comparatively accurate value can be obtained as the correction value.

However, according to the first comparative embodiment, the number of scanning times for recording the test pattern and the number of reading times for reading the test pattern are remarkably increased compared to those according to the first exemplary embodiment. Thus, a time required for recording and reading of the test pattern is prolonged, and consumptions of the ink and the recording medium increase.

Next, a second comparative embodiment is described in detail.

According to the second comparative embodiment, a partial pattern is recorded from all discharge ports in only one time of scanning. Unless otherwise described, recording and reading of the test pattern are performed similarly to those according to the first exemplary embodiment.

Figure 11:
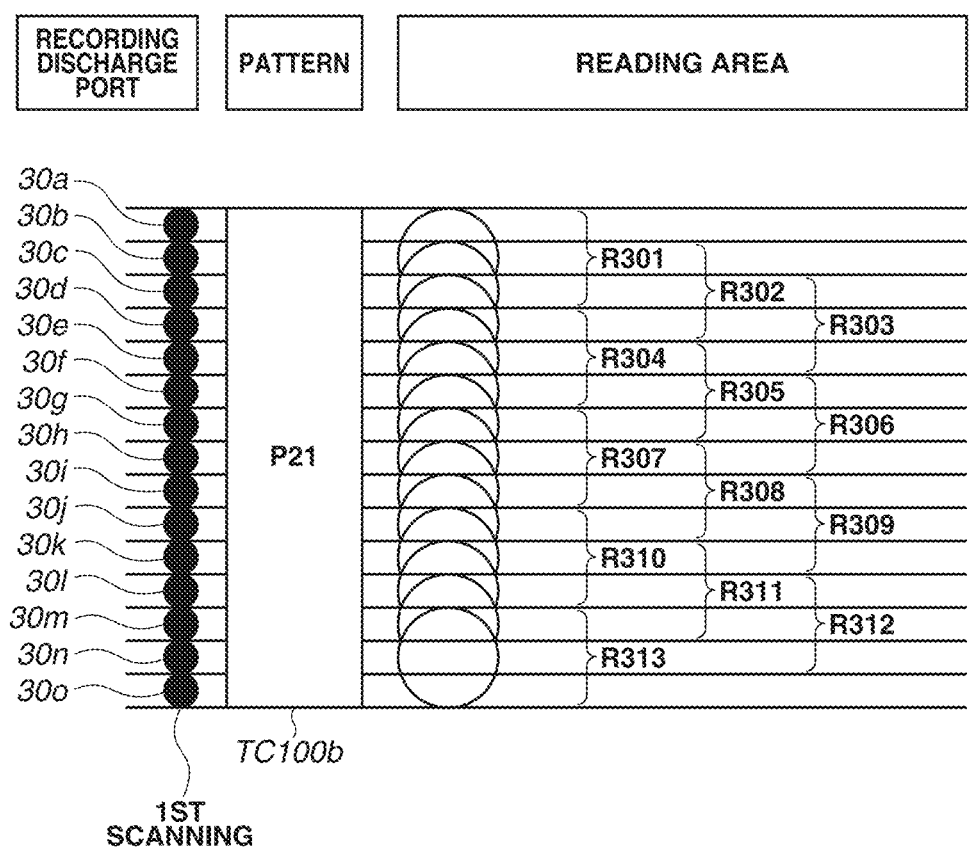
FIG. 11 illustrates recording and reading processes of a test pattern according to the comparative embodiment.

FIG. 11 illustrates recording and reading processes of a partial pattern TC100b according to the second comparative embodiment.

According to the second comparative embodiment, the discharge ports 30a to 30o are all used in first scanning, and recording of the partial pattern TC100b is completed by only the first scanning as described above. Since recording of the test pattern is completed only one time of scanning, a time required for recording of the test pattern is shortened according to the second comparative embodiment.

Next, the partial pattern TC100b is read.

According to the second comparative embodiment, first, reading is performed on a reading area R301 corresponding to an area recorded using the discharge ports 30a, 30b, and 30c in the partial pattern TC100b. Then, the recording medium is conveyed by one pixel.

Next, reading is performed on a reading area R302 corresponding to an area recorded using the discharge ports 30$b$, 30$c$, and 30$d$ in the partial pattern TC100$b$. Then, the recording medium is conveyed by one pixel.

Next, reading is performed on a reading area R303 corresponding to an area recorded using the discharge ports 30$c$, 30$d$, and 30$e$ in the partial pattern TC100$b$. Subsequently, reading and conveyance are repeatedly executed on reading areas R304 to R313 in the similar manner, and reading of the partial pattern TC100$b$ is completed.

When recording and reading of the test pattern are performed as illustrated in FIG. 11, each of the reading areas R301 to R313 is recorded by three discharge ports. Therefore, it is desirable to use an average value of a plurality of read values of a plurality of the reading areas recorded by the discharge port as a density value corresponding to the discharge port as similar to the first exemplary embodiment. Accordingly, the influence of discharge characteristics of the discharge ports other than the discharge port of which the density value is calculated can be cancelled to some extent.

Thus, according to the second comparative embodiment, for example, an average value of the read values of the reading areas R301 and R302 including the areas recorded from the discharge port 30$b$ is obtained as the density value corresponding to the discharge port 30$b$. Further, an average value of the read values of the reading areas R301, R302, and R303 including the areas recorded from the discharge port 30$c$ is obtained as the density value corresponding to the discharge port 30$c$.

However, according to the second comparative embodiment, regarding the discharge ports at the edge portions of the discharge port array, namely the discharge ports 30$a$ and 30$o$ respectively have only one reading area which includes the area recorded from the relevant discharge port. Particularly, only the reading area R301 includes the area recorded from the discharge port 30$a$, and only the reading area R313 includes the area recorded from the discharge port 30$o$ among the reading areas R301 to R313. Therefore, calculation of the density values corresponding to the discharge ports 30$a$ and 30$o$ can use only the read values of the respective reading areas R301 and R313. In this regard, the reading area R301 is recorded from the discharge ports 30$b$ and 30$c$ in addition to the discharge port 30$a$, and the reading area R313 is recorded from the discharge ports 30$m$ and 30$n$ in addition to the discharge port 30$o$. Therefore, the density unevenness due to the variation in the discharge characteristics of the discharge ports 30$a$ and 30$o$ cannot be suitably suppressed by the density values obtained based only on the read values of the reading areas R301 and R313.

Further, if a portion including the white background, for example, an area shifted one pixel upward from the reading area R301 is read, a plurality of reading areas including the area recorded from the discharge port 30$a$ can be set. However, even in this case, the density value to be obtained is significantly lowered in the reading area including the white background, and the suitable correction value of the discharge port 30$a$ cannot be obtained.

As described above, there is a possibility that prolongation of the time required for recording and reading of the test pattern and increase in consumptions of the ink and the recording medium are caused in the first comparative embodiment, and density unevenness caused by the variation in the discharge characteristics of the discharge ports at the edge portions in the discharge port array is generated in the second comparative embodiment.

In contrast, according to the present exemplary embodiment, regarding the discharge ports other than those at the edge portions which can obtain average values of a plurality of reading areas, a test pattern is recorded in one scanning and read in a plurality of times, so that a required time can be shortened, and used amounts of the ink and the recording medium can be reduced. Further, regarding the discharge ports at the edge portions, the test pattern is recorded for one reading area using only the relevant discharge port in a plurality of times of scanning, so that a correction value which can suitably suppress density unevenness can be calculated by only one reading operation.

According to the above-described first exemplary embodiment, only the discharge ports at the both edge portions of the discharge port array record a test pattern in a plurality of times of scanning.

In contrast, according to a second present exemplary embodiment, a test pattern is recorded in a plurality of times of scanning by not only discharge ports at both edge portions in a discharge port array but also discharge ports adjacent to the discharge ports at the both edge portions.

Descriptions of portions similar to those of the above-described first exemplary embodiment are omitted.

As the reading resolution of the multipurpose sensor 313 is lower, there is a possibility that the number of the discharge ports increases which cause density unevenness when a test pattern is recorded from all of the discharge ports in the discharge port array in one scanning.

For example, as described with reference to FIG. 11, in the case that the reading resolution is three pixels, there is a possibility that the discharge ports 30$a$ and 30$o$ cause density unevenness even the test pattern is recorded from all of the discharge ports in one scanning, however, there is little concern that the discharge ports 30$b$ and 30$n$ cause density unevenness.

This is because, for example, the discharge port 30$b$ performs recording on a plurality of the reading areas R301 and R302, and the influence of discharge characteristics of the discharge ports other than the discharge port 30$b$ can be cancelled to some extent by calculating an average value of these read values. Further, in the reading area R301, since the center of the reading area is recorded from the discharge port 30$b$ and strongly influenced by the discharge characteristic of the discharge port 30$b$, the weighted average is calculated by weighting the read value of the reading area R301, and thus the influence of the discharge characteristics of the discharge ports other than the discharge port 30$b$ can be further cancelled.

In contrast, in the case that the reading resolution is reduced, for example, to five pixels, when the test pattern is recorded from all of the discharge ports in one scanning and read, there is a possibility that the discharge ports 30$b$ and 30$n$ cause density unevenness.

Figure 12:
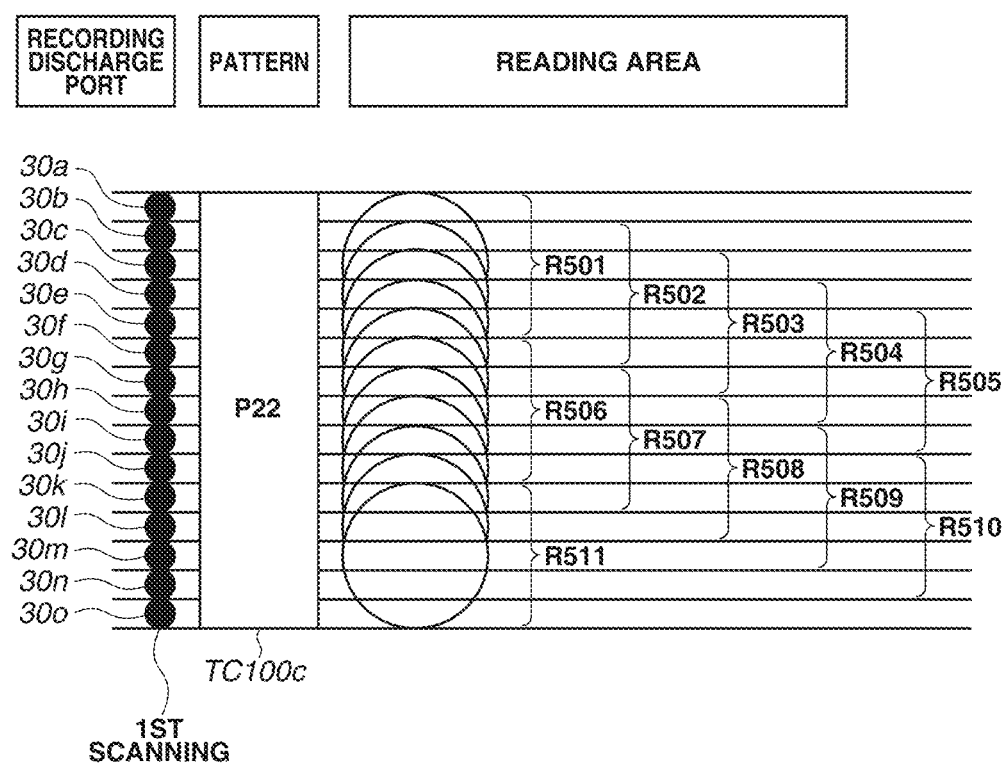
FIG. 12 illustrates an example of recording and reading processes of a test pattern.

FIG. 12 illustrates recording and reading processes of a test pattern when a partial pattern TC100$c$ is recorded in one scanning and read in the case that the reading resolution is five pixels. FIG. 12 illustrates a case in which conditions of recording and reading of the test pattern are the same as those illustrated in FIG. 11 except that the reading resolution of the multipurpose sensor 313 is lowered.

In the case that the reading resolution is five pixels, an area recorded by five discharge ports is regarded as an area read in one reading operation. For example, as illustrated in FIG. 12, in a first reading operation, an area recorded using the discharge ports 30$a$, 30$b$, 30$c$, 30$d$, and 30$e$ is a reading area R501. In a next reading operation, an area recorded using the discharge ports 30$b$, 30$c$, 30$d$, 30$e$, and 30$f$ is a reading area R502.

When a density value corresponding to the discharge port 30b is calculated, the read values of the reading areas including the areas recorded using the discharge port 30b, namely the reading areas R501 and R502 are used.

However, the reading areas R501 and R502 respectively include the areas recorded by the discharge ports 30a, 30c, 30d, and 30e and the areas recorded by the discharge ports 30c, 30d, 30e, and 30f in addition to the areas recorded by the discharge port 30b. Therefore, if an average value is calculated from the read values of the reading areas R501 and R502, the discharge characteristics of the discharge ports 30c, 30d, and 30e are reflected to both read values, and the influence of the discharge characteristics of the discharge ports 30c, 30d, and 30e cannot be cancelled.

Further, the discharge ports 30c and 30d respectively perform recording on the centers of the reading areas R501 and R502. Therefore, the read value of the reading area R501 and the read value of the reading area R502 are respectively strongly influenced by the discharge characteristic of the discharge port 30c and the discharge characteristic of the discharge port 30d, and even if weighted averages are calculated from the read values of the reading areas R501 and R502, the influence of the discharge characteristic of the discharge port 30b cannot be cancelled.

In view of the above-described points, according to the present exemplary embodiment, the test pattern is recorded in a plurality of times of scanning with respect to the discharge ports 30b and 30n adjacent to the discharge ports 30a and 30o at the both edge portions in the discharge port array.

Figure 13:
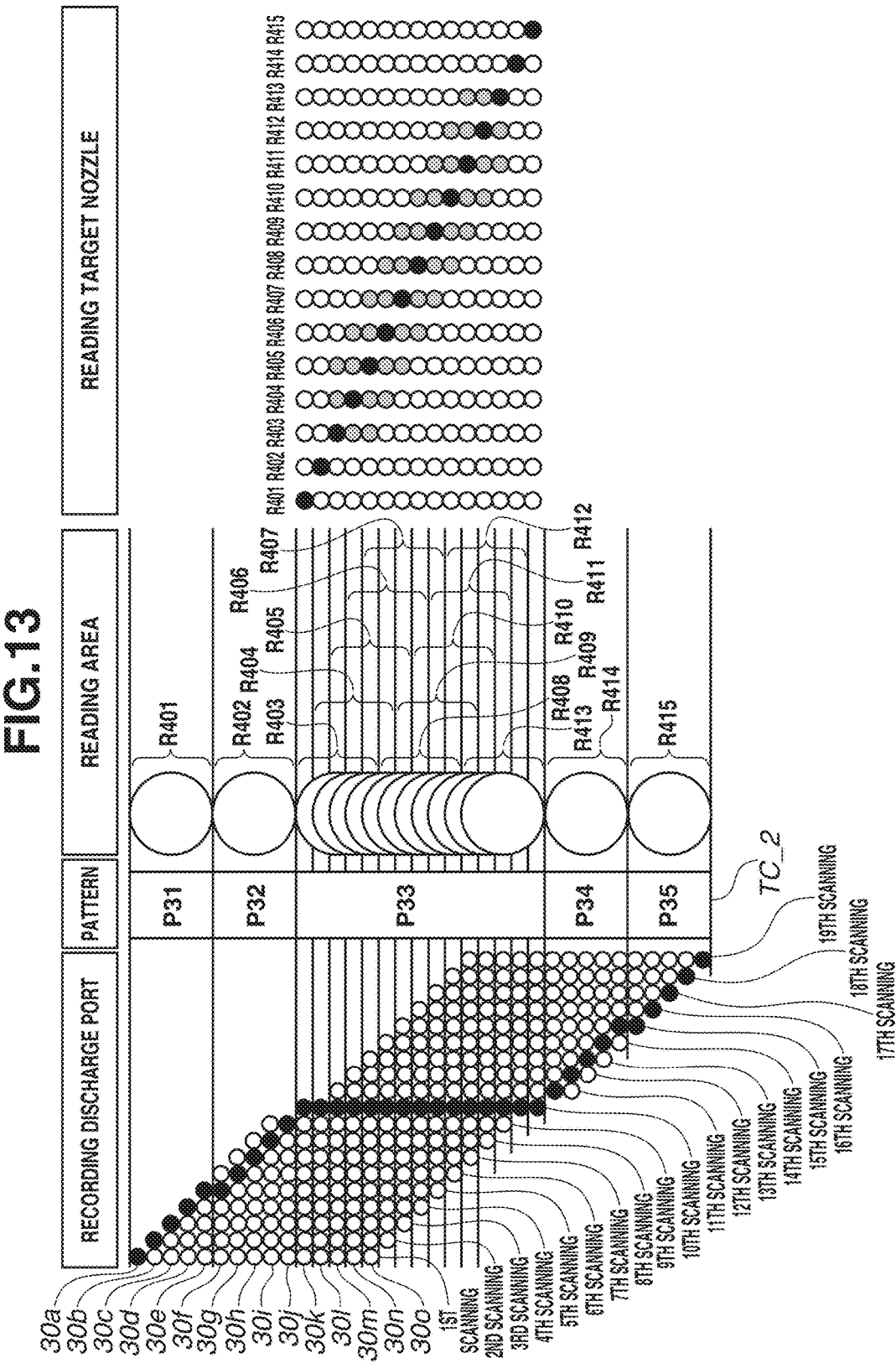
FIG. 13 illustrates recording and reading processes of a test pattern according to the exemplary embodiment.

FIG. 13 illustrates recording and reading processes of a partial pattern TC_2 in a test pattern according to the present exemplary embodiment.

First, in first to fourth scanning, the partial pattern TC_2 is recorded using only the discharge port 30a at the edge portion on the upstream side of the Y direction in the discharge port array. The recording medium is conveyed only for a distance corresponding to one discharge port between each scanning.

After completion of the fourth scanning, the recording medium is conveyed only for the distance corresponding to one discharge port. Further, recording is performed using the discharge ports 30a and 30b while performing fifth scanning. Then, the recording medium is conveyed only for the distance corresponding to one discharge port.

Next, the partial pattern TC_2 is recorded using only the discharge port 30b while performing sixth to ninth scanning. The recording medium is conveyed only for the distance corresponding to one discharge port between each scanning.

After completion of the ninth scanning, the recording medium is conveyed only for a distance corresponding to two discharge ports. Then, recording is performed using all of the discharge ports 30a to 30o while performing tenth scanning.

Next, the partial pattern TC_2 is recorded using only the discharge port 30n while performing 11th to 14th scanning. The recording medium is conveyed only for the distance corresponding to one discharge port between each scanning.

After completion of the 14th scanning, the recording medium is conveyed only for the distance corresponding to one discharge port. Further, recording is performed using the discharge ports 30n and 30o while performing 15th scanning. Subsequently, the recording medium is conveyed only for the distance corresponding to one discharge port.

Next, the partial pattern TC_2 is recorded using only the discharge port 30o while performing 16th to 19th scanning. The recording medium is conveyed only for the distance corresponding to one discharge port between each scanning.

Recording is performed while performing the above-described first to 19th scanning, and thus the recording of the partial pattern TC_2 is completed. In the partial pattern TC_2, an area P31 (five pixels) at the edge portion on the upstream side of the Y direction is recorded from the discharge port 30a in the first to fifth scanning, and an area P32 (five pixels) adjacent to the area P31 is recorded from the discharge port 30b in the fifth to ninth scanning. On the other hand, an area P34 (five pixels) at the edge portion on the downstream side of the Y direction in the partial pattern TC_2 is recorded from the discharge port 30n in the 11th to 15th scanning, and an area P35 adjacent to the area P34 is recorded from the discharge port 30o in the 15th to 19th scanning. Further, an area P33 other than the areas P31, P32, P34, and P35 in the partial pattern TC_2 is recorded from all of the discharge ports 30a to 30o in the tenth scanning.

Subsequently, the reading operation is executed on the recorded test pattern. As described above, the reading resolution according to the present exemplary embodiment is five pixels.

First, reading is performed on a reading area R401 corresponding to the area P31 recorded using only the discharge port 30a in the partial pattern TC_2. Then, the recording medium is conveyed by five pixels.

Next, reading is performed on a reading area R402 corresponding to the area P32 recorded using only the discharge port 30b in the partial pattern TC_2. Then, the recording medium is conveyed by five pixels.

Next, reading is performed on a reading area R403 corresponding to the areas recorded using the discharge ports 30a, 30b, 30c, 30d, and 30e in partial pattern TC_2. Then, the recording medium is conveyed by one pixel.

Subsequently, reading of reading areas R404 to R413 in the partial pattern TC_2 illustrated in FIG. 13 and conveyance of the recording medium by one pixel are alternately repeated in a similar manner.

Next, when reading of the reading area R413 is completed, the recording medium is conveyed by five pixels, and reading is performed on a reading area R414 corresponding to the area P34 recorded using only the discharge port 30n in the partial pattern TC_2. Then, the recording medium is conveyed by five pixels.

Next, reading is performed on a reading area R415 corresponding to the area P35 recorded using only the discharge port 30o in the partial pattern TC_2. By reading of the reading area R415, the reading operation of the partial pattern TC_2 is completed.

Subsequently, density values of the respective discharge ports 30a to 30o are calculated. Regarding the discharge ports 30a, 30b, 30n, and 30o, the read values of the respective reading areas R401, R402, R414, and R415 are obtained as the density values. Further, regarding the other discharge ports 30c to 30m, respective density values are calculated by calculating average values of the read values of a plurality of the reading areas including the areas recorded from the respective discharge ports similar to the first exemplary embodiment.

As described above, according to the present exemplary embodiment, the test pattern is recorded in a plurality of times of scanning with respect to the discharge ports 30b and 30n and read, and the density values are calculated. Accordingly, when density unevenness occurs not only in the discharge ports at the both edge portions but also in the discharge ports adjacent to the discharge ports at the both edge portions, the density unevenness can be suppressed.

In the above description, the test pattern is recorded in five times of scanning with respect to the discharge ports 30b and 30n as with the discharge ports 30a and 30o, however, the number of scanning times may be reduced with respect to the discharge ports 30b and 30n.

For example, the discharge ports 30a and 30o may record a test pattern in five times of scanning as illustrated in FIG. 13, and the discharge ports 30b and 30n may record a test pattern in two times of scanning.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each exemplary embodiment, the configuration is described which calculates a correction value used for color shift correction for each discharge port as illustrated in FIGS. 7A to 7C, however, the processing can be executed by another configuration. For example, a plurality of discharge ports is regarded as a unit, and a correction value used for color shift correction may be calculated for each unit. In this case, for example, an average value of correction values of the respective discharge ports in the unit may be used as the correction value belonging to the unit.

According to the first exemplary embodiment, the configuration is described in which a test pattern is recorded in three times of scanning by the discharge ports at the edge portions and in one time of scanning by the discharge ports other than those. According to the second exemplary embodiment, the configuration is described in which a test pattern is recorded in five times of scanning by the discharge ports at the edge portions and the discharge ports adjacent thereto and in one time of scanning by the discharge ports other than those. However, the processing can be executed by another configuration. When the number of scanning times by the discharge port at the edge portion which is required for recording each area in the test pattern is defined as K times, and the number of scanning times by the discharge port other than the edge portion is defined as L times, K may be greater than or equal to 2 (K≥2), and L may be smaller than K (L<K). However, it is desirable that L is equal to one (L=1) so as to make a recording time as short as possible. Further, it is desirable that K has a larger value as the reading resolution of the multipurpose sensor is lower in order to accurately measure the discharge characteristic of the discharge port at the edge portion.

According to each exemplary embodiment, the recording apparatus and the recording method using the recording apparatus are described, however, the disclosure can be applied to an image processing apparatus and an image processing method for generating data for performing the recording method described in each exemplary embodiment. Further, the disclosure can be applied to a configuration which prepares a program for performing the recording method described in each exemplary embodiment separately from the recording apparatus.

The disclosure can be effectively applied to various image recording apparatuses such as a piezo type ink jet recording apparatus ejecting ink using piezoelectric elements in addition to a thermal jet type ink jet recording apparatus.

A "recording medium" widely includes not only paper used in general recording apparatuses but also cloth, a plastic film, a metal plate, glass, ceramic, wood, leather, and others which can receive ink.

An "ink" represents a liquid which can be used, by being imparted to a recording medium, for forming of an image, a figure, a pattern, and the like, processing of the recording medium, and processing of ink (for example, solidification or insolubilization of a coloring agent in the ink imparted to the recording medium).

The recording apparatus according to the disclosure can suitably suppress occurrence of density unevenness due to variation in discharge characteristics of discharge ports while suppressing increase in a cost of the recording apparatus.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-213537, filed Oct. 31, 2016, which is hereby incorporated by reference herein in its entirety.

What is claimed is:

1. A recording apparatus comprising:
    a recording head provided with a discharge port array in which a plurality of discharge ports for discharging an ink is arranged in an array direction and configured to scan a recording medium based on recording data;
    a test pattern recording unit configured to record a test pattern on a recording medium using the recording head;
    a reading unit configured to read the test pattern by relative movement between the recording unit and the recording medium, on which the test pattern is recorded, in the array direction, a reading resolution of the reading unit in the array direction being lower than the arrangement resolution of the plurality of discharge ports;
    an obtaining unit configured to obtain image data corresponding to an image recorded by discharge from the plurality of the discharge ports;
    a correction unit configured to correct the image data based on a read result of the test pattern; and
    a generation unit configured to generate the recording data based on image data corrected by the correction unit,
    wherein the test pattern recording unit records the test pattern so that K (K≥2) number of first areas recorded in each of the K times of scanning by the recording head using a first discharge port at an edge portion in the array direction in the discharge port array and a second area recorded in each of L (L≥1) times of scanning by the recording head using a second discharge port at a center side area in the array direction than the edge portion of the discharge port array are aligned in the array direction.

2. The recording apparatus according to claim 1, wherein the correction unit (i) corrects image data corresponding to the first discharge port based on only a read result of a first reading area including the first area and (ii) corrects image data corresponding to the second discharge port based on both of a read result of a second reading area including the second area and a read result of a third reading area which includes the second area and overlaps with the second reading area at a portion and does not overlap therewith at another portion.

3. The recording apparatus according to claim 2, wherein
the first reading area is an area recorded using only discharge from the first discharge port,
the second reading area is an area recorded using the second discharge port and a third discharge port in a vicinity of the second discharge port, and
the third reading area is an area recorded using the second discharge port and a fourth discharge port which is in a vicinity of the second discharge port and different from the third discharge port.

4. The recording apparatus according to claim 2, further comprising a conveying unit configured to convey the recording medium in the array direction,
and wherein the reading of the test pattern is performed by alternately repeating the reading by the reading unit and the conveyance of the recording medium by the conveying unit.

5. The recording apparatus according to claim 2, wherein the correction unit corrects image data corresponding to the second discharge port based on an average of a read result of the second reading area and a read result of the third reading area.

6. The recording apparatus according to claim 5, wherein the correction unit corrects image data corresponding to the second discharge port by weighting one of a read result of the second reading area and a read result of the third reading area.

7. The recording apparatus according to claim 1, wherein in the test pattern, the first and the second areas are aligned in an order of the first area, the second area, and the first area along the array direction.

8. The recording apparatus according to claim 1, wherein L is equal to one (L=1).

9. The recording apparatus according to claim 1, wherein
the plurality of discharge ports is constituted of a first discharge port group including the first discharge port and a second discharge port group including the second discharge port, and
the test pattern recording unit records the test pattern by recording using a discharge port belonging to the first discharge port group in each of the K times of scanning and by recording using a discharge port belonging to the second discharge port group in each of the L times of scanning.

10. The recording apparatus according to claim 9, wherein a number of discharge ports belonging to the first discharge port group is less than a number of discharge ports belonging to the second discharge port group.

11. The recording apparatus according to claim 1, wherein the correction unit comprises:
a first correction unit configured to generate a correction value corresponding to each of a plurality of discharge ports based on a density value obtained from a read result of a reading area corresponding to each of the plurality of discharge ports in the test pattern and a predetermined reference value; and
a second correction unit configured to correct image data corresponding to each of the plurality of discharge ports using a correction value corresponding to each of the plurality of discharge ports.

12. A method comprising:
recording a test pattern on a recording medium using a recording head provided with a discharge port array in which a plurality of discharge ports for discharging an ink is arranged in an array direction and configured to scan a recording medium based on recording data;
reading the test pattern by relative movement between the recording unit and the recording medium, on which the test pattern is recorded, in the array direction, a reading resolution of the reading unit in the array direction being lower than the arrangement resolution of the plurality of discharge ports;
obtaining image data corresponding to an image recorded by discharge from the plurality of the discharge ports;
correcting the image data based on a read result of the test pattern;
generating the recording data based on corrected image data; and
recording the test pattern so that K (K≥2) number of first areas recorded in each of the K times of scanning by the recording head using a first discharge port at an edge portion in the array direction in the discharge port array and a second area recorded in each of L (L≥1) times of scanning by the recording head using a second discharge port at a center side area in the array direction than the edge portion of the discharge port array are aligned in the array direction.

13. The method according to claim 12, wherein (i) image data corresponding to the first discharge port is corrected based on only a read result of a first reading area including the first area, and (ii) image data corresponding to the second discharge port is corrected based on both of a read result of a second reading area including the second area and a read result of a third reading area which includes the second area and overlaps with the second reading area at a portion and does not overlap therewith at another portion.

14. The method according to claim 13, wherein
the first reading area is an area recorded using only discharge from the first discharge port,
the second reading area is an area recorded using the second discharge port and a third discharge port in a vicinity of the second discharge port, and
the third reading area is an area recorded using the second discharge port and a fourth discharge port which is in a vicinity of the second discharge port and different from the third discharge port.

15. The method according to claim 13, wherein the reading is performed by alternately repeating reading the test pattern and conveying the recording medium.

16. The method according to claim 13, wherein image data corresponding to the second discharge port is corrected based on an average of a read result of the second reading area and a read result of the third reading area.

17. The method according to claim 16, wherein image data corresponding to the second discharge port is corrected by weighting one of a read result of the second reading area and a read result of the third reading area.

18. The method according to claim 12, wherein in the test pattern, the first and the second areas are aligned in an order of the first area, the second area, and the first area along the array direction.

19. The method according to claim 12, wherein L is equal to one (L=1).

20. The method according to claim 12, wherein the correcting comprises:
   generating a correction value corresponding to each of a plurality of discharge ports based on a density value obtained from a read result of a reading area corresponding to each of the plurality of discharge ports in the test pattern and a predetermined reference value; and
   correcting image data corresponding to each of the plurality of discharge ports using a correction value corresponding to each of the plurality of discharge ports.

* * * * *